(12) United States Patent
Campau et al.

(10) Patent No.: US 8,802,258 B2
(45) Date of Patent: Aug. 12, 2014

(54) LOW PROFILE MANIFOLD FOR SINGLE POINT WATERING SYSTEM FOR LEAD-ACID BATTERIES

(75) Inventors: Daniel N. Campau, Ada, MI (US); Patrick Mavrakis, Alta Loma, CA (US)

(73) Assignees: Flow-Rite Controls, Ltd., Byron Center, MI (US); Trojan Battery Company, Santa Fe Springs, CA (US)

( * ) Notice: Subject to any disclaimer, the term of this patent is extended or adjusted under 35 U.S.C. 154(b) by 1626 days.

(21) Appl. No.: 12/346,105

(22) Filed: Dec. 30, 2008

(65) Prior Publication Data

US 2010/0167109 A1  Jul. 1, 2010

(51) Int. Cl.
| | | |
|---|---|---|
| *H01M 2/12* | (2006.01) | |
| *H01M 2/36* | (2006.01) | |
| *H01M 10/06* | (2006.01) | |
| *H01M 10/12* | (2006.01) | |

(52) U.S. Cl.
CPC ............. *H01M 2/362* (2013.01); *H01M 10/06* (2013.01); *H01M 10/12* (2013.01); *Y02E 60/12* (2013.01); *H01M 2/1205* (2013.01); *H01M 2/1252* (2013.01)
USPC .............................................. 429/82; 429/72

(58) Field of Classification Search
None
See application file for complete search history.

(56) References Cited

U.S. PATENT DOCUMENTS

| | | | |
|---|---|---|---|
| 2,678,344 A | 5/1954 | Strohlein | |
| 5,832,946 A | 11/1998 | Campau | |
| 6,227,229 B1 | 5/2001 | Campau | |
| 6,644,338 B1 | 11/2003 | Campau | |
| 6,782,913 B2 | 8/2004 | Campus | |
| 7,029,786 B2 * | 4/2006 | Campau | 429/64 |
| 2004/0161661 A1 * | 8/2004 | Campau | 429/72 |
| 2006/0269832 A1 | 11/2006 | Hutchinson | |

FOREIGN PATENT DOCUMENTS

| | | |
|---|---|---|
| EP | 0529760 | 3/1993 |
| EP | 529760 A1 * | 3/1993 |
| EP | 0578606 | 1/1994 |

OTHER PUBLICATIONS

Notification of the Transmittal of the International Search Report and the Written Opinion of the International Searching Authority, or the Declaration, PCT US2009/ 065833, Mar. 3, 2010.

* cited by examiner

*Primary Examiner* — Barbara Gilliam
*Assistant Examiner* — Adam A Arciero
(74) *Attorney, Agent, or Firm* — Warner Norcross & Judd LLP

(57) ABSTRACT

A single point watering assembly for a monobloc battery having a plurality of cell access ports each have a top edge. The assembly includes a manifold and a plurality of valve cartridges. The manifold overlies the access ports and includes extensions each extending into one of the access ports. Each valve cartridge is supported by one of the manifold extensions and is located below the top edge of the respective access port. Consequently, the assembly presents a low profile extending above the battery.

18 Claims, 7 Drawing Sheets

LOW PROFILE MANIFOLD FOR SINGLE POINT WATERING SYSTEM FOR LEAD-ACID BATTERIES

BACKGROUND OF THE INVENTION

The present invention relates to single point watering (SPW) systems for lead-acid batteries, and more particularly to valve-manifold assemblies for use in such systems.

Valve-manifold assemblies have become an important component in SPW systems used on monobloc batteries. Examples of such assemblies are illustrated in U.S. Pat. No. 7,029,786, issued Apr. 18, 2006 to Campau; U.S. Pat. No. 6,782,913, issued Aug. 31, 2004 to Campau; U.S. Pat. No. 6,644,338 to Campau; and U.S. Pat. No. 6,227,229, issued May 8, 2001 to Campau. These assemblies address the need to simplify tubing connections in watering systems, reduce the number of parts, and reduce installation time. They are widely used in marine, golf cart, recreational vehicle (RV), and mobile equipment applications.

However, in many applications, battery compartments are so limited in space that these manifolds cannot be used on the batteries because the manifolds would interfere with structure above the batteries, such as golf cart seats. Consequently, known manifolds cannot be used in applications where the height or space above the battery is limited. And therefore manifolds cannot be used in a wide variety of applications in which their use would be desirable.

SUMMARY OF THE INVENTION

The aforementioned problem is overcome in the present invention providing a low profile SPW valve-manifold assembly that can be installed on and used with monobloc batteries in limited space or clearance environments. More specifically, the SPW assembly includes a manifold and a plurality of valve cartridges supported by the manifold. The manifold includes a plurality of bosses each adapted to extend through one of the access ports on a monobloc battery. The valve cartridges are supported within the bosses and are located below the top of the battery when the SPW assembly is mounted on the battery. Consequently, the valve cartridges are located entirely within the battery and only the manifold extends above the battery. Consequently, the present invention presents a low profile or low height arrangement enabling the SPW assembly to be used in a wide variety of applications with limited space or clearance.

The benefits of the present invention are numerous. First, the assembly does not interfere with overhead structure above the battery. Second, the assembly enables battery manufacturers to install the systems in the factory, during battery production, before the batteries are shipped to customers. Third, the assembly enables the batteries to continue to be bulk packed in the normal manner and in the same density. Fourth, the assembly is less subject to potential damage during shipping and handling of the batteries, allowing the SPW system to be offered as original equipment to customers rather than as a field-installed accessory.

In a preferred embodiment of the invention, the manifold press-fits or snap-fits into the battery vent port openings. This feature enables standard production rates to be maintained without the additional requirement for specialized installation tools or procedures. Press-fit installations also assist in achieving a low profile.

These and other objects, advantages, and features of the invention will be more fully understood and appreciated by reference to the description of the current embodiment and the drawings.

DESCRIPTION OF THE CURRENT EMBODIMENT

Figure 1:
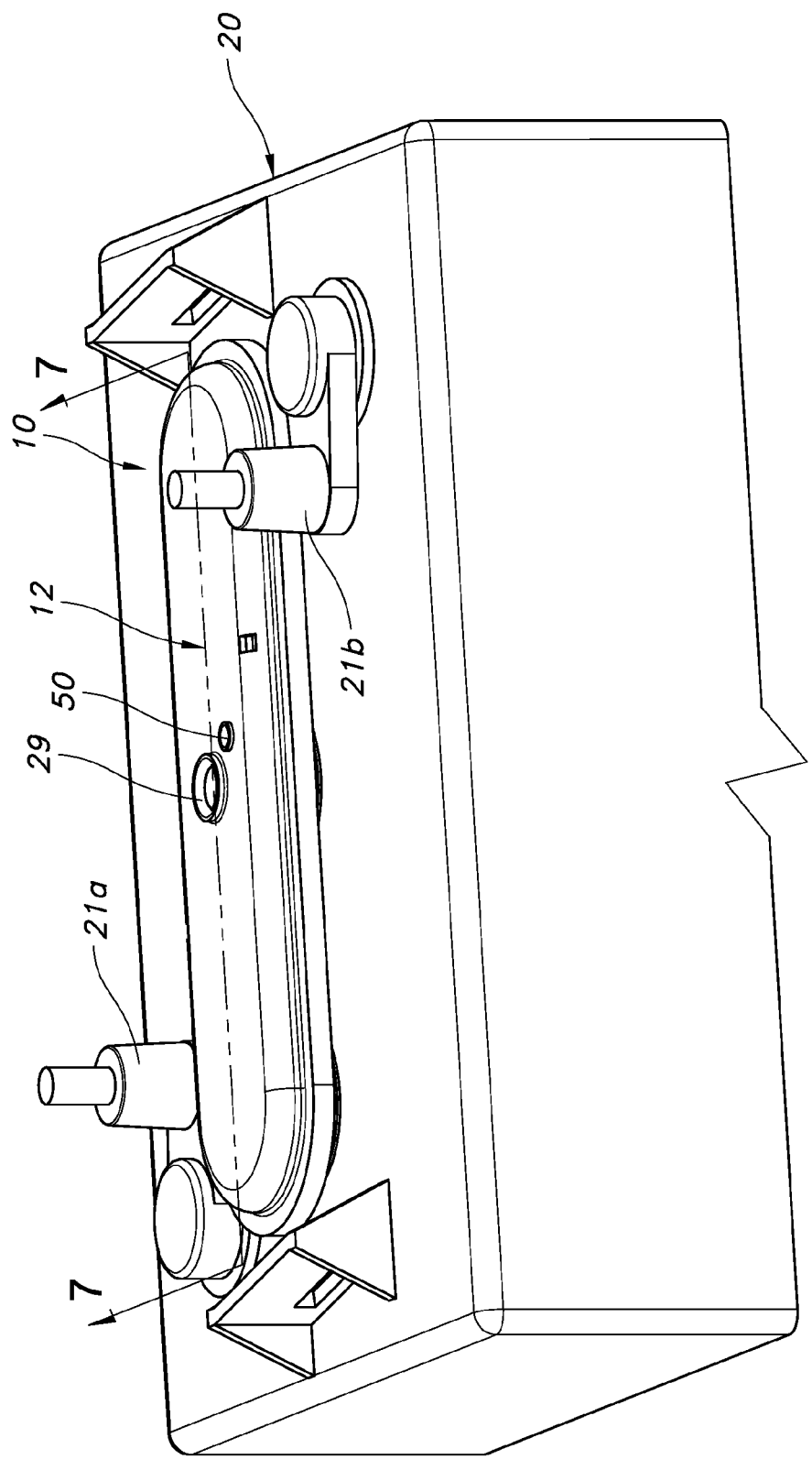
FIG. 1 is a fragmentary perspective view of the single point watering (SPW) assembly of the present invention installed on a monobloc battery.
Figure 2:
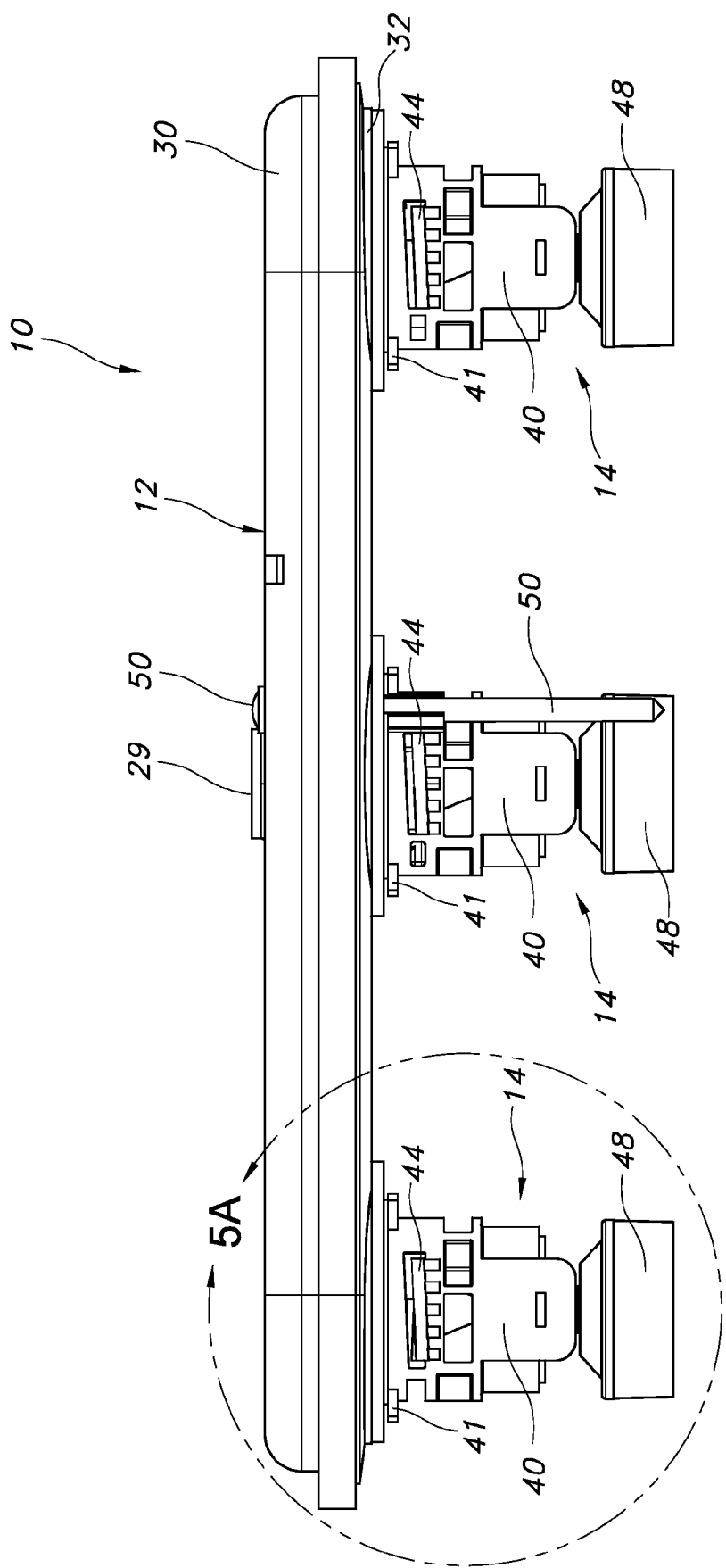
FIG. 2 is a side elevation view of the SPW assembly.

A single point watering (SPW) assembly is illustrated in the drawings and generally designated 10. The assembly 10 includes a manifold 12 and a plurality of valve cartridges 14 supported by the manifold. The assembly 10 can be mounted on a battery 20. When so mounted, each of the valve cartridges 14 is located below the top of the battery 20; and only the manifold 12 extends above the battery. The assembly 10 therefore presents a low profile, which is essentially the same as the profile or height of a conventional battery vent cap. Consequently, the assembly 10 may be used in a wide variety of applications not previously possible.

I. Battery

The battery 20 of the current embodiment is a lead-acid monobloc battery. Alternatively, the present invention may be readily adapted for use with other lead-acid batteries, or other batteries using electrolyte. The battery includes a pair of terminals 21$a$ and 21$b$.

Figure 6:
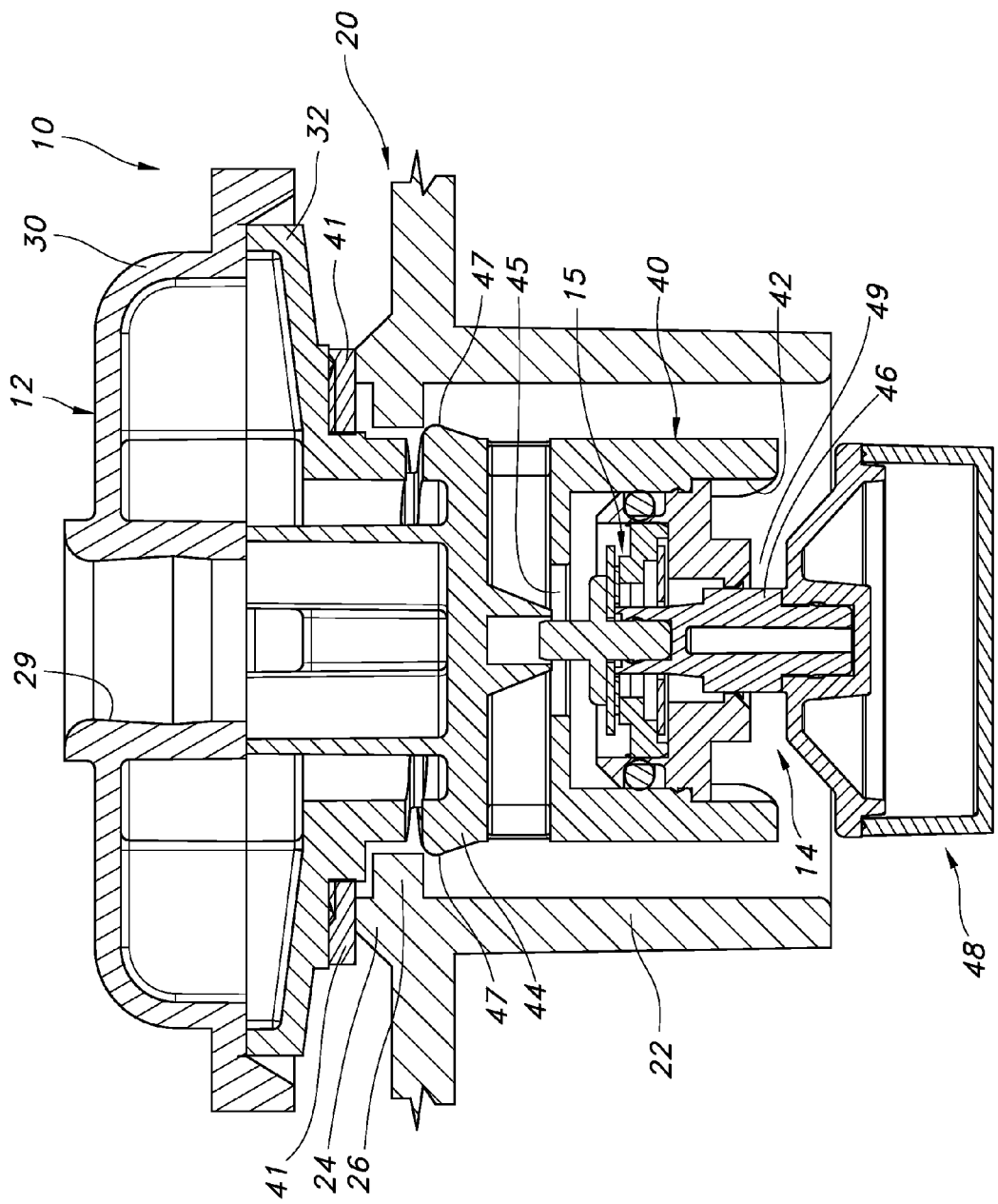
FIG. 6 is a sectional view of the portion of the assembly illustrated in FIG. 5A.
Figure 7:
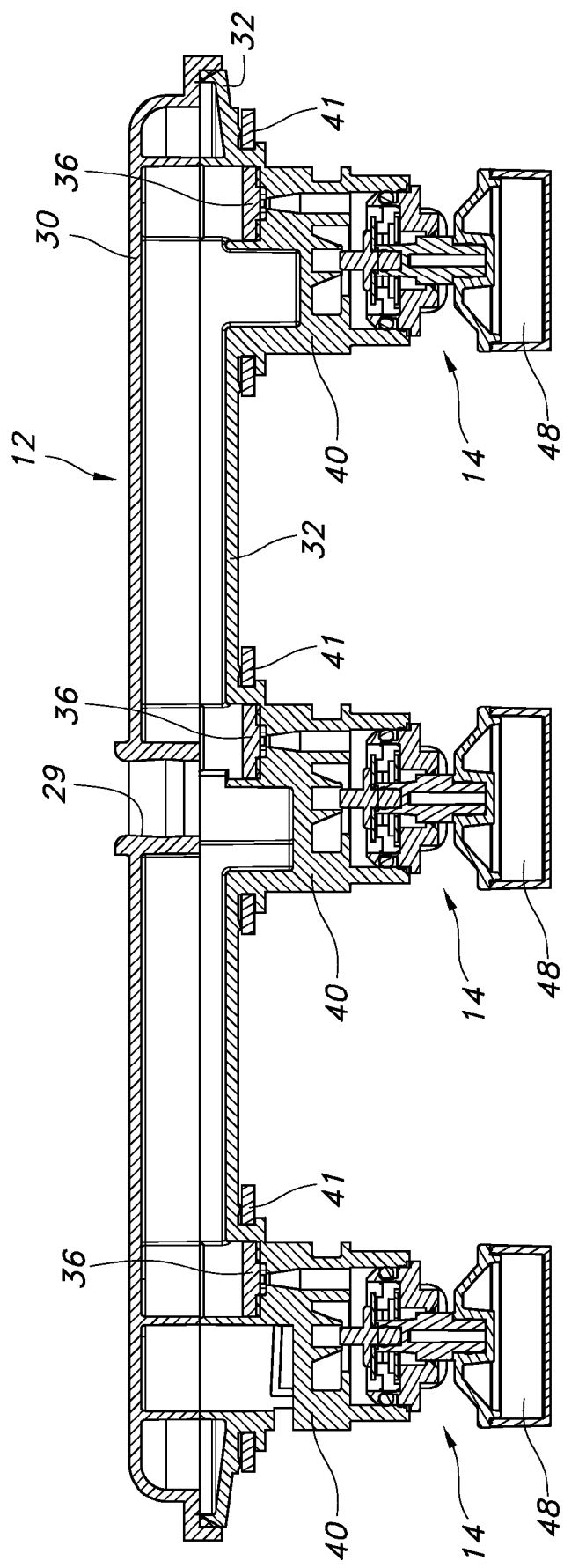
FIG. 7 is a sectional view of the assembly taken long Line 7-7 in FIG. 1.

The battery 20 includes a plurality of cells (not shown) each having an access port or vent port 22 (see FIGS. 1 and 6) extending through the top of the battery. As seen in FIG. 6, each access port 22 includes a top edge 24 defining the uppermost point on the battery 20. The access port 22 includes an internal thread 26 for receiving a conventional vent cap. The access ports 22 provide two functions. First, the ports permit water to be added to the battery as necessary. Second, the ports permit gasses generated within the battery to be vented from the battery. The access ports 22 typically share a common centerline, and are typically arranged in groups of three.

Typically, the access ports 22 are covered by a closure assembly (not shown) providing a single integral structure of three vent caps. The closure assembly includes a passageway for cell gasses to vent to the atmosphere. The closure assemblies are press-fitted or snap-fitted within the cell openings.

As illustrated, the top edges 24 of the access ports 22 are coplanar, and the access ports are equally spaced from one another. Other configurations of the access ports are possible, and the present invention can be readily adapted to accommodate such variations.

II. SPW Valve-Manifold Assembly

In the current embodiment, the normal closure assembly is replaced by the valve-manifold assembly 10. The assembly 10 press-fits within the battery 20 and specifically within the access ports 22 of each cell. The assembly 10 provides a path for water to flow into the cell during the refill cycle, and for gasses to leave the cells and vent to the atmosphere whenever the gas pressure exceeds ambient (atmospheric) pressure. The assembly 10 also seals the cell opening 22 so that electrolyte does not leak onto the battery top in cases of tilting and/or sloshing.

The assembly 10 enables the valve displacer 48 to communicate with the electrolyte, and the valve 15 to control the electrolyte level. The manifold 12 of the assembly 10 includes three bosses or extensions 40, which extend from the bottom of the manifold 12 to press-fit into the cell vent port openings 22. An annular seal or gasket 41 on each boss provides and maintains a leak-resistant seal under normal shock, vibration, and handling loads. Each boss 40 has an inside diameter appropriate for receiving and supporting a valve cartridge 14 including a displacer 48 for regulating the level of the electrolyte within the cell. The cartridges 14 also provide space for water to flow into the cell and for gasses to flow from the cell into the manifold 12.

A. Manifold

The manifold 12 includes an upper member or portion 30, a lower member or portion 32, and a plurality of flame arresters 34 and 36. The upper and lower members 30 and 32 are integrally joined to one another for example using sonic welding, heat welding, or adhesive. The upper member 30 defines a water inlet port 29 for receiving a water fitting (not shown).

Figure 3:
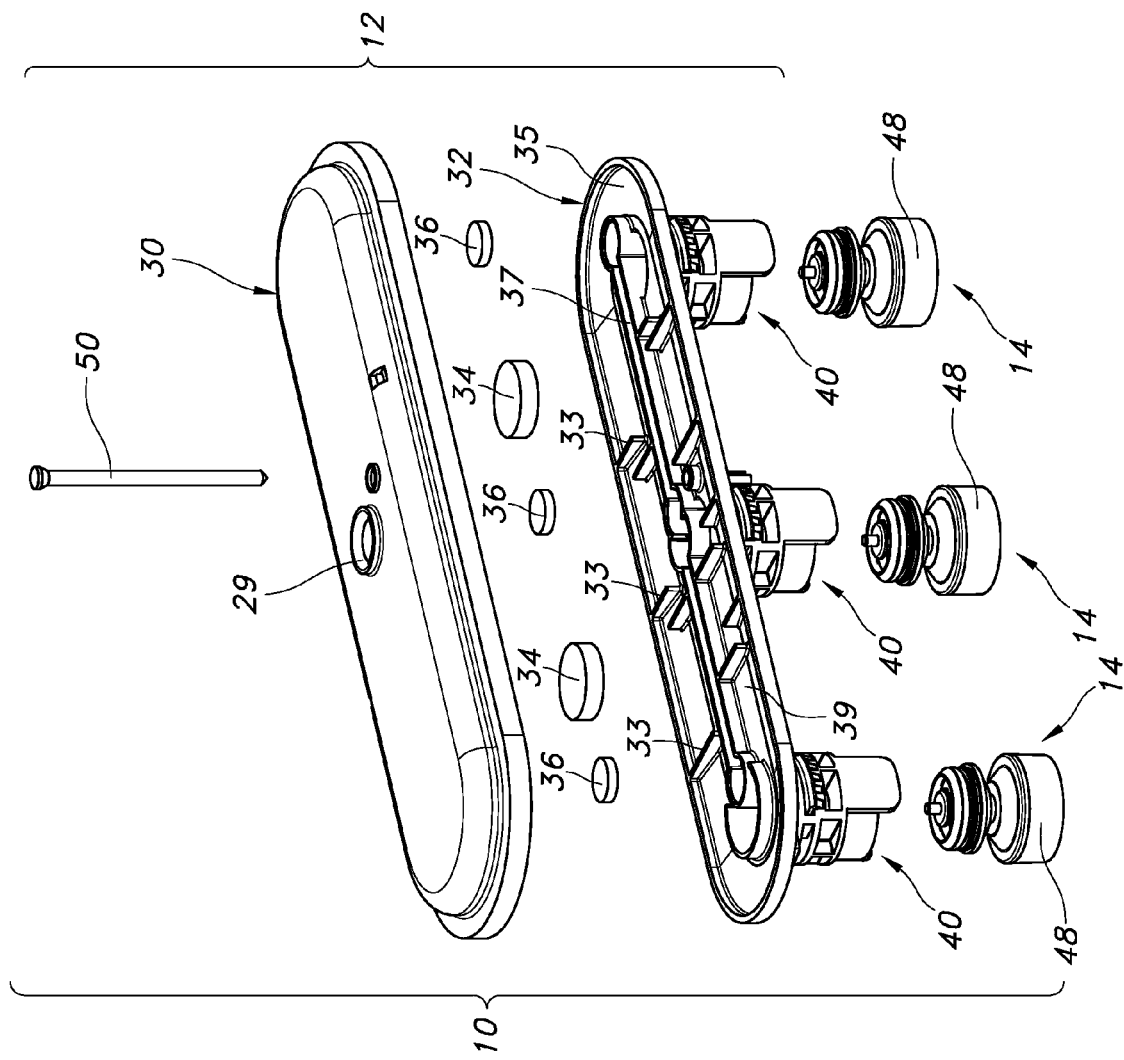
FIG. 3 is an exploded perspective view of the SPW assembly.
Figure 4:
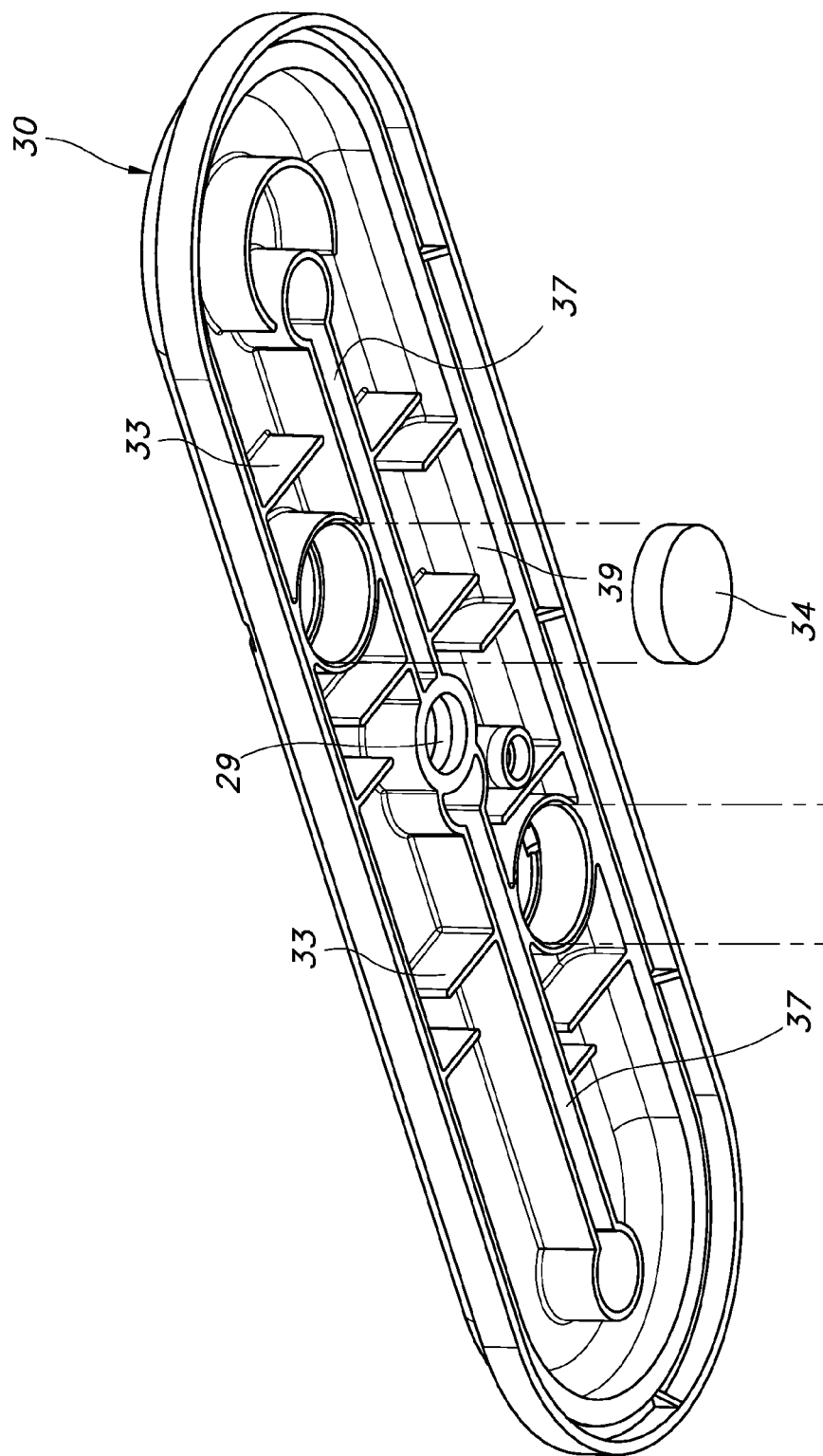
FIG. 4 is a lower perspective view of the upper manifold member.

The upper and lower members 30 and 32 cooperatively define water passageways 37 and air passageways 39 (see FIGS. 3-4). The water passageways 37 enable water to be delivered to the valve cartridges 14, and the gas passageways 39 permit gas to escape from the cells through the manifold 12. Conventional flame arresters 34 and 36 are press-fitted within the upper and lower members 32 and 34 respectively to provide flame suppression.

Bosses or extensions 40 are integral with and extend downwardly from the remainder of the manifold 12, and specifically the lower member 34. Each boss 40 is generally circular in cross section enabling the boss to be inserted into an access port 22. The internal wall 42 of the boss 40 is shaped and dimensioned to receive a valve cartridge 14 through the lower end of the boss as will be described.

Figure 5:
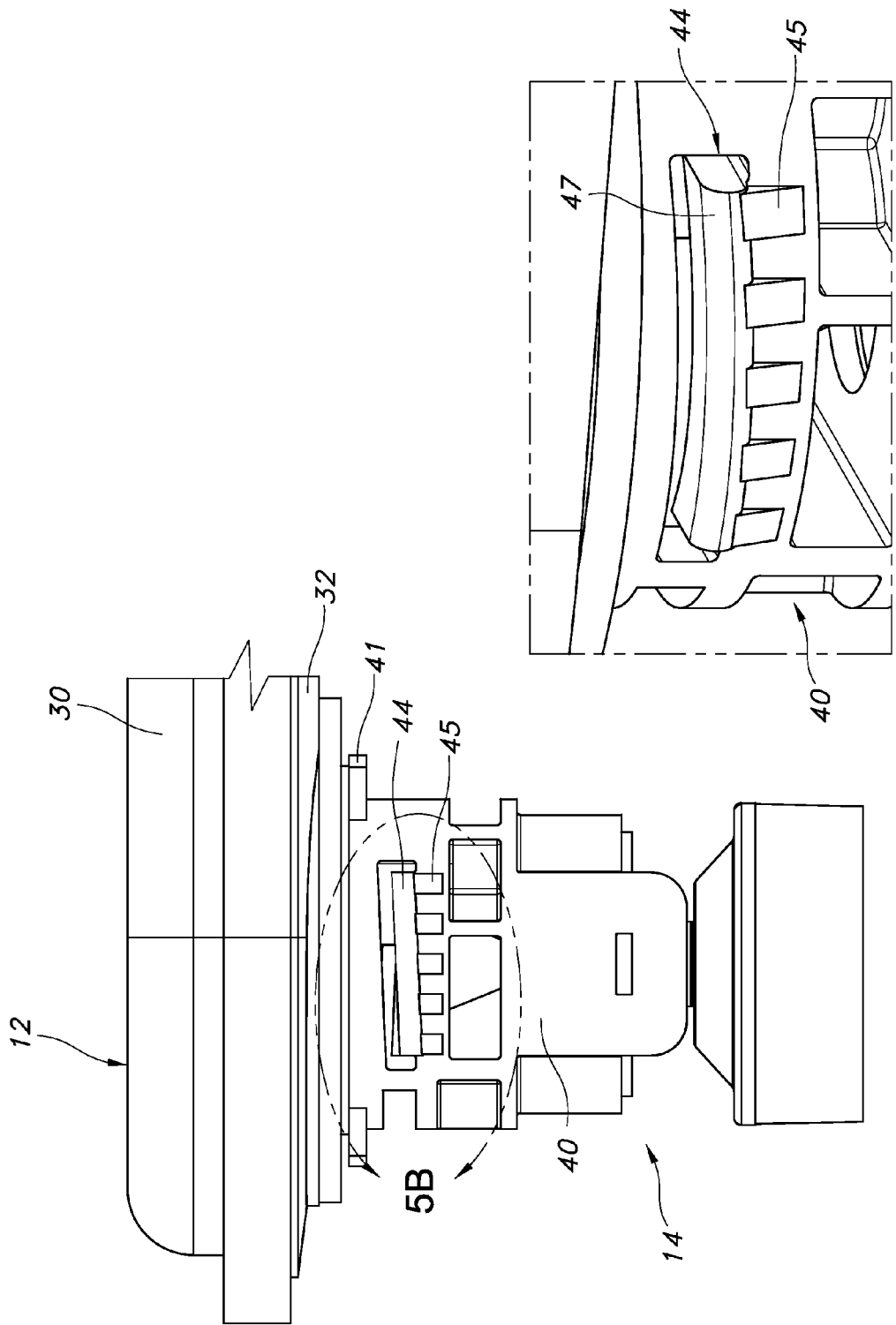
FIG. 5A is an enlarged side elevation view of the portion of the assembly within Line 5A in FIG. 2.
FIG. 5B is an enlarged perspective view of the area within Line 5B in FIG. 5A.

Each boss 40 includes a tab 44 on its exterior surface (see FIGS. 5A-6). The tab 44 is shaped and dimensioned to snap-fit with the internal thread 26 within the access port 22. The tab 44 therefore provides a retention means for retaining the manifold 12 within the battery 20. As perhaps best illustrated in FIGS. 5A-5B, the tab is angled slightly from the horizontal to improve the interfit with the thread 26 in the access port 22. The snap-fit between the tab 44 and the internal thread 26 enables the assembly 10 to be press-fit or snap-fit into the battery 10.

The illustrated tabs 44 of the current embodiment are adapted for use with batteries having quarter-turn bayonet-style lugs. The tabs 44 are free on three sides and supported by ribs 45 on the lower edge. The tab thickness can be selected for the desired flexibility. The shape and slope of the retaining surface 47 (see FIG. 5B) can be selected as desired for retention, sealing, and removability. Other suitable press-fit attachment to other types of vent ports will be recognized by those skilled in the art. For example, DIN standard vent ports typically include an O-ring rather than a gasket; and the diameter of the cylindrical enclosure typically would be modified to match the DIN requirements. The retaining tabs would be configured to the DIN standard.

Each boss 40 includes an annual seal or gasket 41 at its base, which seals the assembly against the top edge 24 of the respective access port 22. The gasket 41 provides a leak-resistant seal between the assembly 10 and the battery 20. Other suitable seals, gaskets, or sealing arrangements will be recognized by those skilled in the art.

The manifold 12 additionally includes an optical indicator 50 extending through the manifold members 30 and 32 to provide a visual indication of the electrolyte level. Optical level indicators are common but their inclusion in manifolds provides additional utility. Prior art manifolds such as those illustrated in the above-identified patents do not permit the use of optical indicators.

B. Valve Cartridge

Each valve cartridge 14 (see FIG. 6 for example) includes an inlet (not shown), two outlets 45 and 49, a valve stem 46, and an actuator, displacer, or float 48. The details of the valve cartridge 40, including the displacer 48, are more fully disclosed in the above identified patents; and the disclosures of those patents are incorporated herein by reference. Consequently, the cartridges 14 need not be described in detail in this application.

III. Assembly, Installation, and Operation

Assembly of the assembly 10 begins by press-fitting the flame arresters 34 and 36 into the upper and lower manifold members 30 and 32 in conventional fashion. The upper and lower members 30 and 32 are then ultrasonically welded or otherwise joined to form a leak-tight manifold 12.

A cartridge 14 is press-fitted into each one of the bosses 40 so that the cartridge is supported by the manifold 12. At this point, the assembly 10 is fully assembled for installation on a battery 20.

To install the assembly 10 on the battery 20, the bosses 40 are aligned with the ports 22, and the assembly is pushed into the battery until the retention means or tabs 44 snap within the threads 22. When so engaged, the seal 41 engages the top edge 24 of each access port 22 to seal the manifold 12 against the battery 20. As perhaps best illustrated in FIG. 6, when the assembly 10 is fully installed within the battery 20, each cartridge 14 is located entirely below the top edge 24 of the access port 22. And consequently, each cartridge 14 is within the interior of the battery 20 and below the top of the battery casing.

To complete the installation of the SPW assemblies 10, a fitting (not shown) is installed within the water inlet 29, and a water supply tube (not shown) is attached to the fitting. Any remaining access ports on the battery 20, and on any other batteries in an array, are also fitted with a valve manifold assembly 10, and water supply tubes (all not shown) are fitted onto the various ports as needed. Examples of complete SPW systems, including tubing and other water-delivering components are illustrated in the above-noted patents.

In use, during the water filling cycle, when the electrolyte level is low, the displacers 48 are low and water passes through valve cartridges 14 and into the battery cell. At the same time, gasses displaced from the cells pass out of the cell through the cartridge 14 and exit the manifold 12 through the flame arresters 34 and 36. When the displacers 48 rise with the rising electrolyte level, the valves close as the electrolyte level in each cell reaches a predetermined or preselected level.

The described embodiment of the present invention provides an SPW assembly having a low profile above the battery. Specifically, the profile is no higher than conventional vent caps currently used to cover battery access ports. Consequently, the present invention enables SPW to be used in a wide variety of applications having limited space or clearance above the battery.

The above description is that of a current embodiment of the invention. Various alterations and changes can be made without departing from the spirit and broader aspects of the invention as defined in the claims, which are to be interpreted in accordance with the principles of patent law including the doctrine of equivalents.

The invention claimed is:

1. A single point watering assembly for a battery having a plurality of cell access ports each having a top edge, the system comprising:
   a manifold overlying the plurality of cell access ports, the manifold including a plurality of bosses integral with and each adapted to extend downwardly from the remainder of the manifold through one of the access ports beyond the associated top edge; and
   a plurality of valve cartridges each supported by one of the manifold bosses, each valve cartridge adapted to be located entirely below the associated top edge when the manifold is mounted on the battery.

2. A single point watering assembly as defined in claim 1 wherein at least one of the bosses snap fits into its associated access port.

3. A single point watering assembly as defined in claim 2 wherein:
   the at least one boss includes a tab; and
   the associated access port includes an internal thread, the tab snap fitting with the internal thread.

4. A single point watering assembly as defined in claim 1 wherein the manifold includes a water distribution path.

5. A single point watering assembly as defined in claim 1 wherein the manifold includes a gas vent path.

6. A single point watering assembly as defined in claim 1 wherein all of the top edges are co-planar.

7. A single point watering assembly as defined in claim 1 wherein the manifold includes a seal for sealing the manifold against the top edge.

8. A single point watering system for a battery including a top defining a plurality of cell access ports, the system comprising:
   a manifold including a plurality of bosses integral with and adapted to extend downwardly from the remainder of the manifold beyond the top of the battery when the manifold is mounted on the battery; and
   a plurality of level control means for controlling a level of an electrolytic fluid within the battery, each of the level control means supported by one of the bosses and adapted to be located entirely below the top of the battery when the system is mounted on the battery.

9. A single point watering system as defined in claim 8 wherein the manifold includes snap fit means for snap fitting the manifold onto the battery.

10. A single point watering system as defined in claim 8 wherein the manifold includes distribution means for distributing water to the level control means.

11. A single point watering system as defined in claim 8 wherein the manifold includes sealing means for sealing the manifold against the top of the battery.

12. A battery assembly comprising:
    a monobloc battery including a plurality of cells each including an access port having a top edge; and
    a single point watering assembly including a manifold and a plurality of valve cartridges, the manifold overlying the plurality of access ports, the manifold including a plurality of bosses integral with and extending downwardly from the remainder of the manifold into one of the access ports beyond the associated top edge, each valve cartridge supported by one of the bosses, each valve cartridge located entirely below the top edge of the respective cell access port.

13. A battery assembly as defined in claim 12 wherein at least one of the bosses snap fits into its associated access port.

14. A battery assembly as defined in claim 13 wherein:
    the at least one boss includes a tab; and
    the associated access port includes an internal thread, the tab snap fitting with the internal thread.

15. A battery assembly as defined in claim 12 wherein the manifold includes a water distribution path.

16. A battery assembly as defined in claim 12 wherein the manifold includes a gas vent path.

17. A battery assembly as defined in claim 12 wherein all of the top edges are co-planar.

18. A battery assembly as defined in claim 12 wherein the manifold includes a seal for sealing the manifold against the top edge.

* * * * *